US012578744B2

(12) United States Patent
Singh et al.

(10) Patent No.: US 12,578,744 B2
(45) Date of Patent: Mar. 17, 2026

(54) MANAGING CURVATURE COMPENSATION IN BANDGAP REFERENCE VOLTAGE OUTPUT IN COMPENSATION CIRCUIT

(71) Applicant: SAMSUNG ELECTRONICS CO., LTD., Suwon-si (KR)

(72) Inventors: Shubham Raj Singh, Bengaluru (IN); Ravindra Kumar Singh, Bengaluru (IN); Subodh Prakash Taigor, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 18/502,138

(22) Filed: Nov. 6, 2023

(65) Prior Publication Data

US 2024/0319754 A1 Sep. 26, 2024

(30) Foreign Application Priority Data

Mar. 24, 2023 (IN) ........................... P202341021252
Jun. 15, 2023 (IN) ............................. 202341021252

(51) Int. Cl.
*G05F 1/567* (2006.01)
*G05F 1/46* (2006.01)
*G05F 3/26* (2006.01)

(52) U.S. Cl.
CPC .............. *G05F 1/567* (2013.01); *G05F 1/468* (2013.01); *G05F 3/262* (2013.01)

(58) Field of Classification Search
CPC ..... G05F 3/10; G05F 3/16; G05F 3/18; G05F 3/185; G05F 3/20; G05F 3/26; G05F 3/30;

(Continued)

(56) References Cited

U.S. PATENT DOCUMENTS 6,677,808 B1 * 1/2004 Sean ......................... G05F 3/30 327/542
7,411,380 B2 * 8/2008 Chang ....................... G05F 3/30 323/907

(Continued)

FOREIGN PATENT DOCUMENTS

CN 1508643 A 6/2004
CN 100428104 C * 10/2008

(Continued)

OTHER PUBLICATIONS

English Translation of CN-100428104.*

(Continued)

*Primary Examiner* — Monica Lewis
*Assistant Examiner* — Nusrat Quddus
(74) *Attorney, Agent, or Firm* — Morgan, Lewis & Bockius LLP

(57) ABSTRACT

Embodiments herein disclose a compensation circuit including an OPAMP having an input connected to a node between one end of a first resistor and a drain of a first PMOS. A fifth PMOS includes a drain connected to a drain of a second NMOS and a gate of sixth PMOS. A gate of second NMOS is connected to a node between a drain of fourth PMOS and one end of third resistor. The sixth PMOS includes a drain connected to one end of fifth resistor and another end of fifth resistor connected to a node between a gate of third NMOS and a gate of a fourth NMOS. A seventh PMOS includes a drain connected to a node between another end of the second resistor and third diode.

10 Claims, 6 Drawing Sheets

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/462; G05F 1/56; G05F 1/562; G05F 1/565; G05F 1/567; G05F 1/569; G05F 1/571; G05F 1/573; G05F 1/5735; G05F 1/26; G05F 1/30
See application file for complete search history.

(56) References Cited

U.S. PATENT DOCUMENTS

| | | | | |
|---|---|---|---|---|
| 7,705,662 | B2 * | 4/2010 | Ng | G05F 3/30 327/539 |
| 7,750,728 | B2 * | 7/2010 | Marinca | G05F 3/30 327/512 |
| 8,542,000 | B1 | 9/2013 | Youssefi | |
| 9,261,415 | B1 * | 2/2016 | Zhang | G05F 3/16 |
| 9,582,021 | B1 | 2/2017 | Arnold et al. | |
| 10,114,400 | B2 * | 10/2018 | Lacy | H03F 3/393 |
| 10,359,801 | B1 * | 7/2019 | Chen | G05F 3/30 |
| 10,606,292 | B1 * | 3/2020 | Lai | G05F 3/30 |
| 2004/0124825 | A1 * | 7/2004 | Marinca | G05F 3/30 323/316 |
| 2004/0150381 | A1 * | 8/2004 | Butler | G05F 3/30 323/313 |
| 2015/0338872 | A1 * | 11/2015 | Afzal | G05F 3/02 323/313 |
| 2016/0026198 | A1 * | 1/2016 | Eberlein | G05F 1/575 323/313 |
| 2016/0357213 | A1 * | 12/2016 | Fort | G05F 3/30 |
| 2017/0012609 | A1 * | 1/2017 | Shen | G05F 3/267 |
| 2017/0227975 | A1 * | 8/2017 | Chu | G05F 1/59 |
| 2023/0107389 | A1 * | 4/2023 | Wu | G05F 3/30 323/313 |
| 2024/0152172 | A1 * | 5/2024 | Chen | G05F 1/468 |

FOREIGN PATENT DOCUMENTS

| | | |
|---|---|---|
| CN | 101788835 A | 7/2010 |
| CN | 101881986 A | 11/2010 |
| CN | 107015595 | 8/2017 |

OTHER PUBLICATIONS

Extended European Search Report dated Jun. 11, 2024 in corresponding European Patent Application No. 24151361.3 (11 pages).
Wan, et al., “A Sub-1-ppm/° C. Curvature-Compensated Bandgap Voltage Reference”, 2016 IEEE International Conference on Integrated Circuits and Microsystems, pp. 81-85.
Hande, et al., “A survey of bandgap and non-bandgap based voltage reference techniques”, Scientia Iranica D (2016) 23(6), pp. 2845-2861.
Tadeparthy, “A CMOS bandgap reference with correction for device-to-device variation”, IEEE International Symposium on Circuits and Systems, May 23, 2004, pp. 397-400.
Meijer, et al.,“A New Curvature-Corrected Bandgap Reference”, IEEE J.Solid-State Circuits, Dec. 1982, vol. SC 17 pp. 1139-1143.
Nicollini, et al., “A Cmos Bandgap Reference for Differential Signal Processing”, IEEE Journal of Solid-State Circuits, vol. 26, No. 1, Jan. 1991, pp. 41-50.

* cited by examiner

MANAGING CURVATURE COMPENSATION IN BANDGAP REFERENCE VOLTAGE OUTPUT IN COMPENSATION CIRCUIT

CROSS REFERENCE TO RELATED APPLICATIONS

This application is related to and claims priority under 35 U.S.C. 119 to Indian provisional application No. 202341021252, filed on Mar. 24, 2023, and Indian patent application Ser. No. 202341021252, filed on Jun. 15, 2023, in the Indian patent office, the contents of which are incorporated by reference herein in their entireties.

TECHNICAL FIELD

The present disclosure relates generally to a bandgap voltage reference circuit and a compensation circuit thereof.

DISCUSSION OF RELATED ART

Currently, an integrated circuit may include a voltage reference source (e.g., bandgap voltage reference source or the like) for generating a reference voltage in a memory element (e.g., flash memory or the like). A bandgap voltage reference source (interchangeably, a "BGR source" or a "bandgap reference") may generate a constant voltage independent of temperature and power supply variations. A bandgap reference is generated by a combination of a Complementary to Absolute Temperature (CTAT) component and a Proportional to Absolute Temperature (PTAT) component. A voltage difference between two diodes in the bandgap source is used to generate a PTAT current in a first resistor. The PTAT current is used to generate a voltage in a second resistor, which is then added to the voltage of one of the diodes. The voltage across a diode operated with the PTAT current is the CTAT component, which decreases with increasing temperature. If the ratio between the first and second resistors is chosen properly, the first order effects of the temperature can be largely cancelled out, providing an approximately constant voltage of about 1.2-1.3 V, depending on the specific environment.

The bandgap voltage reference source is used to provide an accurate, temperature independent reference voltage, which desirably minimizes effects of power supply voltage and temperature related variations impacting circuitry of the memory element. Referring to FIG. 1, one of the ways to improve accuracy of a reference is to add a compensation circuit 100. In the compensation circuit 100, an operational amplifier (OPAMP) includes a first input (i.e., positive terminal) connected to a node between one end of a first resistor R1 and a drain of a first P-channel metal-oxide semiconductor transistor (PMOS) P1. Another end of the resistor R1 connects to a first diode D1. Further, the OPAMP includes a second input (i.e., negative terminal) connected to a node between a second diode D2 and a drain of a second PMOS P2. A third PMOS P3 includes a drain connected with one end of a second resistor $R_{OUT}$. Another end of the second resistor $R_{OUT}$ is connected to a third diode D3. A fourth PMOS $M_T$ includes a drain connected to a drain of a N-channel metal-oxide semiconductor (NMOS) M1, where a source of the NMOS M1 is connected to a drain of a NMOS M0 and a gate of the first NMOS M0.

A fifth PMOS $M_X$ including a drain connected to a drain of a NMOS M2 and a gate of a sixth PMOS $M_Y$. A gate of the NMOS M2 is connected to a node between a drain of the fourth PMOS $M_T$ and a source of the NMOS $M_1$. The sixth PMOS $M_Y$ including a drain connected to one end of a resistor Rz, wherein another end of the resistor Rz is connected to a node between a gate of the NMOS $M_Z$ and a gate of a NMOS $M_W$.

In the compensation circuit 100, a part of the PTAT current gets copied from a core block 102 to $4^{th}$ branch, via the transistor $M_T$. That the PTAT current when passes through the NMOS M1 and NMOS M0, generates $V_D$. A compensation current is generated at the resistor $R_P$.

$$I_C = \frac{V_D - V_{GS2} - V_{BE}}{R_P},$$

where $VGS_2$ is a gate to source voltage of NMOS M2, and VBE is tapped from BJT diode D2. The compensation current gets equally distributed between last two branches, via current mirror (i.e., PMOS $M_X$ and the PMOS $M_Y$). Lower current mirrors (i.e., NMOS $M_Z$ and NMOS $M_W$) have an aspect ratio of 1:N, where N may be ≥1. Hence, a part of $I_C$ flows back to the diode D2 via a tapping connection. This way, a higher order compensation current is generated and fed back to a PTAT generation block (i.e., core block 102), hence adding non-linearity there in the compensation circuit 100. This non-linearity in the PTAT block 102 gets copied to an output branch (i.e., the output branch contains diode D3), so that the compensation circuit 100 has output BGR voltage=I*$R_{OUT}$+VBE3, where I is the non-linear PTAT current.

A compensation current $I_C$ in the circuit 100 may be determined with the following equations, which include MOS threshold voltage variables $V_{th0}$ and $V_{th2}$:

a. $V_D = 2V_{th0} + k_0\sqrt{I_{PTAT}}$, b. $V_{GS2} = V_{th2} + k_2\sqrt{I_C}$, and c. $I_C = \frac{V_D - V_{GS2} - V_{BE}}{R_P}$ where, $$k_0 = \frac{1}{\sqrt{\mu\frac{C_{OX}W}{L}}}$$

and $$k_2 = \frac{1}{\sqrt{\mu\frac{C_{OX}W}{L}}}$$

where, $V_{TH0}$=MOSFET ("MOS") threshold voltage, $V_{GS}$=Gate to source voltage of MOS, μ=mobility, $C_{OX}$=process variable, W=MOS width, L=MOS length, and $V_{BE}$=base to emitter voltage of a "BJT diode" (also called a "diode-connected BJT").

Hence, the output BGR voltage depends on MOS process corner variations (due to the $C_{OX}$ variable). Note that the MOSFETs are not designed to play a part in BGR voltage generation, theoretically. This is because the MOSFETs are used just to copy current in the core block 102 of the compensation circuit 100. However, the addition of a compensation block makes the BGR voltage output sensitive to MOS process corner variation.

Further, adding non-linearity in the PTAT part makes BGR output highly sensitive to the compensation current. Because, the altered PTAT current, in the output block passes through the resistor $R_{OUT}$ and the diode D3. Any change in the PTAT current, due to effect of compensation block, will have logarithmic effect on the diode D3 VBE, which is satisfactory, but in addition, it will also have a linear effect on BGR output, since it passes through the resistor $R_{OUT}$ too.

Combined, these two issues make it difficult to achieve a desired effect of curvature compensation from the compensation circuit 100. In other words, the correction current alters PTAT current characteristics, and after copied, it passes through both a resistor and a diode in the output block. So, the compensation circuit 100 becomes very sensitive to the compensation current. As the equations above reflect, the current $I_C$ is dependent on a Vth component, and therefore it depends on MOS process corners as well. Hence, $I_C$ is sensitive to MOS process corners.

It is desired to address the above mentioned disadvantages and/or other shortcomings or at least provide a useful alternative.

SUMMARY

Embodiments disclosed herein relate to a compensation circuit and a method for managing a curvature compensation in a bandgap reference voltage output in the compensation circuit. Embodiments herein may reduce a curvature of a bandgap reference's output with respect to temperature, so as to improve temperature drift behavior (or temperature dependent voltage error) in the compensation circuit. This may result in higher accuracy output in the compensation circuit (or the bandgap reference circuit).

Embodiments herein may use an improved CTAT linearization scheme that provides improvement (almost 50%) in bandgap reference output voltage curvature, compared to existing methods. Embodiments of a compensation circuit herein may reduce the sensitivity of a compensation block for MOS corners.

In an embodiment, a compensation circuit includes an operational amplifier (OPAMP) having a first input connected to a node between a first end of a first resistor and a drain of a first P-channel metal-oxide semiconductor (PMOS). The OPAMP includes a second input connected to a node between a second diode and a drain of a second PMOS. A third PMOS including a drain connected to a first end of a second resistor, where a second end of the second resistor is connected to a third diode. A fourth PMOS includes a drain connected to one end of a third resistor, where another end of the third resistor is connected to a drain of a first N-channel metal-oxide semiconductor (NMOS) and a gate of the first NMOS. A fifth PMOS includes a drain connected to a drain of a second NMOS and a gate of a sixth PMOS, wherein a gate of the second NMOS is connected to a node between a drain of the fourth PMOS and the one end of the resistor. The sixth PMOS includes a drain connected to one end of a fifth resistor, where another end of the fifth resistor is connected to a node between a gate of the third NMOS and a gate of a fourth NMOS. A seventh PMOS includes a drain connected to a node between the second end of the second resistor and the third diode.

In Various Options:

The third resistor and the first NMOS may be connected in series to reduce a compensation current dependence on a metal-oxide semiconductor (MOS) process corner.

The compensation current may be copied in the seventh PMOS and fed to a node between the second resistor and the third diode such that the compensation current has a logarithmic effect on a bandgap reference voltage output and sensitivity of the compensation current on the bandgap reference voltage output is reduced.

The compensation circuit may control a curvature of bandgap reference voltage output with respect to temperature in a memory, wherein the memory includes a NAND flash and a NOR Flash.

The compensation circuit may control a complementary-to-absolute temperature (CTAT) linearization for curvature correction in a bandgap reference voltage output.

The third NMOS and the first NMOS may have a ratio of 1:1, to maintain a linearity of PTAT slope by ensuring that no current flows into a PTAT block.

The first diode is larger than the second diode, so that $VBE_1$ of the first diode is smaller than $VBE_2$ of the second diode, and the OPAMP ensures that voltage at the first end of the first resistor is equal to the $VBE_2$.

The first PMOS, the second PMOS and the third PMOS may form a current mirror, and wherein another end of the first resistor is connected to a first diode.

The OPAMP may be connected to a start-up block, wherein the start-up block handles a zero current situation in the compensation circuit.

Embodiments herein further disclose methods for managing a curvature compensation in a bandgap reference voltage output in a compensation circuit. A method includes feeding an output compensation current to an output block of a PMOS in the compensation circuit. The compensation circuit makes an output voltage VREF less sensitive to a compensation current. The compensation circuit includes an OPAMP having a first input connected to a node between one end of a first resistor and a drain of a first PMOS. The OPAMP includes a second input connected to a node between a second diode and a drain of a second PMOS. A third PMOS includes a drain connected to one end of a second resistor, wherein another end of the second resistor is connected to a third diode. A fourth PMOS includes a drain connected to one end of a third resistor, where another end of the third resistor is connected to a source of a first NMOS and a gate of the first NMOS. A fifth PMOS includes a drain connected to a drain of a second NMOS and a gate of a sixth PMOS. A gate of the second NMOS is connected to a node between a drain of the fourth PMOS and the one end of the resistor. The sixth PMOS includes a drain connected to one end of a fifth resistor, where another end of the fifth resistor is connected to a node between a gate of the third NMOS and a gate of a fourth NMOS. A seventh PMOS includes a drain connected to a node between the other end of the second resistor and the third diode.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the scope thereof.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
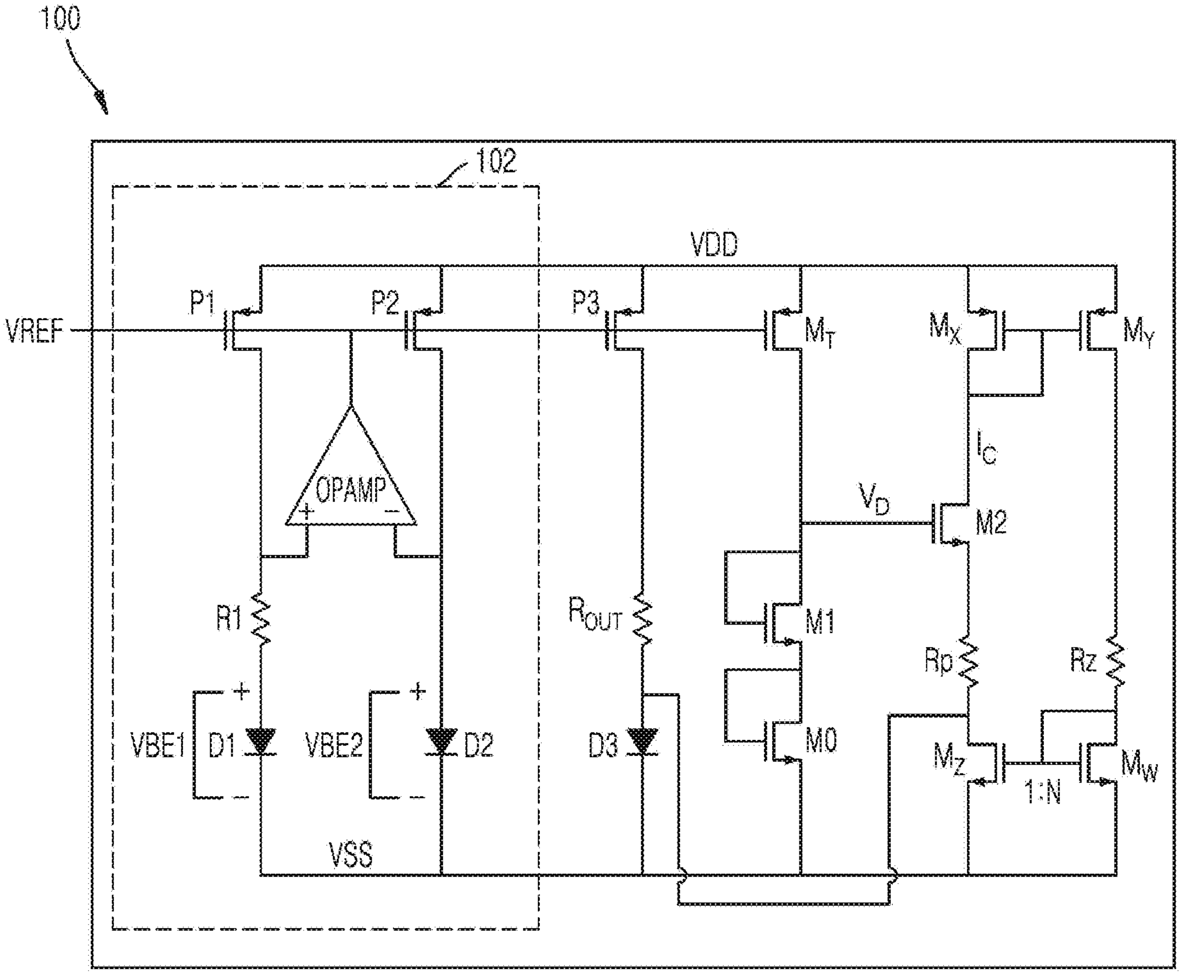
FIG. 1 illustrates a circuit diagram of a compensation circuit, according to prior art.

The example embodiments herein and the various features and advantageous details thereof are explained more fully with reference to the drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the inventive concepts.

Embodiments herein achieve a compensation circuit that includes an operational amplifier (OPAMP) having a first input connected to a node between one end of a first resistor and a drain of a first P-channel metal-oxide semiconductor (PMOS). The OPAMP includes a second input connected to a node between a second diode and a drain of a second PMOS. A third PMOS including a drain connected to one end of a second resistor, where another end of the second resistor is connected to a third diode. A fourth PMOS includes a drain connected to one end of a third resistor, where another end of the third resistor is connected to a drain of a first N-channel metal-oxide semiconductor (NMOS) and a gate of the first NMOS. A fifth PMOS includes a drain connected to a drain of a second NMOS and a gate of a sixth PMOS, wherein a gate of the second NMOS is connected to a node between a drain of the fourth PMOS and the one end of the resistor. The sixth PMOS includes a drain connected to one end of a fifth resistor, where another end of the fifth resistor is connected to a node between a gate of the third NMOS and a gate of a fourth NMOS. A seventh PMOS includes a drain connected to a node between the other end of the second resistor and the third diode.

Unlike conventional methods and systems, embodiments herein of a compensation circuit and method for managing a curvature compensation in a bandgap reference voltage output in the compensation circuit reduces a curvature of the bandgap reference's output with respect to temperature, so as to improve temperature drift behavior (or temperature dependent voltage error) in the compensation circuit. As a result, higher accuracy output in the compensation circuit is achievable. The compensation circuit may use an improved CTAT linearization scheme that provides improvement (almost 50%) in the bandgap reference output's curvature, compared to the existing methods. Embodiments of the compensation circuit may reduce the sensitivity of a compensation block to MOS process corners.

It is noted here that each of the first to third diodes D1, D2 and D3 may be a "diode-connected bipolar junction transistor (BJT)", which is a BJT with its base and collector tied together to form a diode. Thus, the voltage "VBE", when discussed herein with respect to a diode, refers to the base to emitter voltage of the diode-connected BJT forming the diode.

It is further noted that herein, when a first circuit element is said to be connected to another circuit element, the first and second circuit elements may be directly (physically) connected (which encompasses a direct connection of each of these circuit elements to a common node illustrated in a schematic diagram), without any intervening circuit elements, or indirectly connected, meaning that one or more intervening circuit elements exists between the first and second components. If a schematic diagram shows the first and second circuit elements directly connected, the schematic diagram illustrates one example of the connection, but an indirect connection may be possible with a third, intervening circuit element in an alternative example, unless the context of the description indicates otherwise, or unless such indirect connection would render the overall circuit unsatisfactory for its intended purpose.

Herein, the slash symbol "/" connecting two items signifies "and" or "or", unless the context indicates otherwise.

Referring now to the drawings, and more particularly to FIGS. 2 through 6, where similar reference characters denote corresponding features consistently throughout the figures, there are shown example embodiments.

Figure 2:
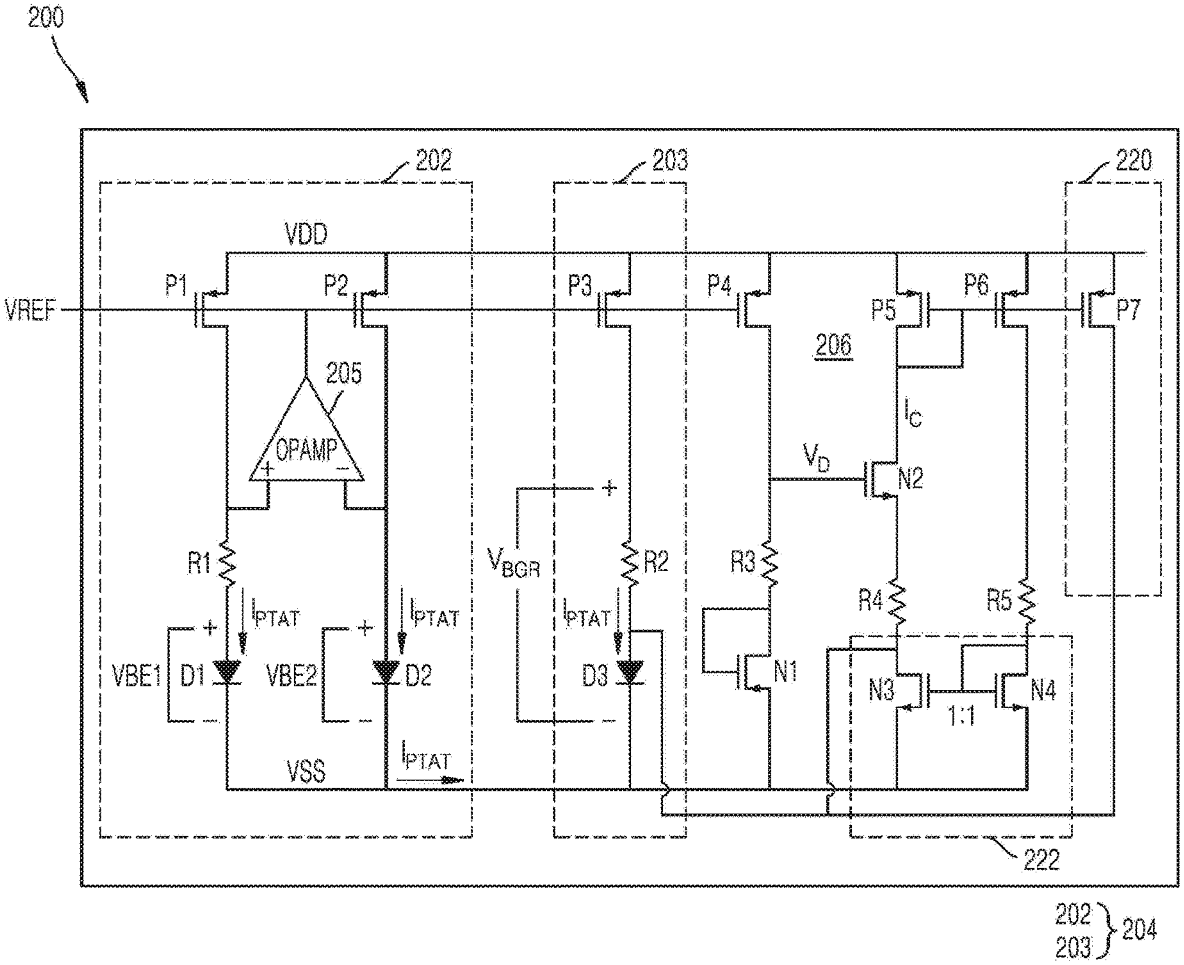
FIG. 2 illustrates a circuit diagram of a compensation circuit, according to an embodiment as disclosed herein.
Figure 3:
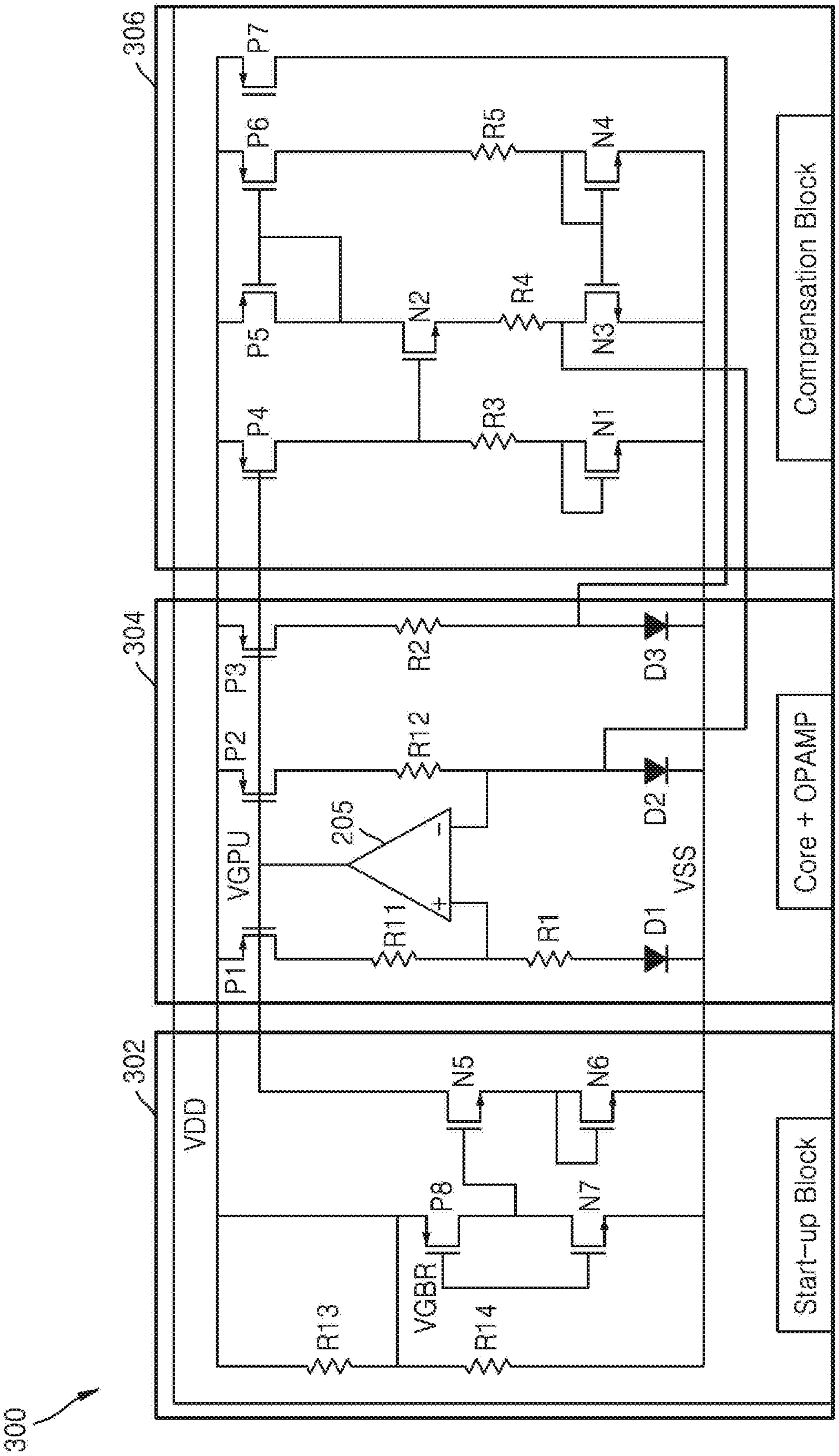
FIG. 3 illustrates another circuit diagram of the compensation circuit, according to an embodiment as disclosed herein.

FIG. 2 illustrates a circuit diagram of a compensation circuit 200, according to an embodiment as disclosed herein. FIG. 3 illustrates another circuit diagram of a compensation circuit, 300, according to an embodiment as disclosed herein. The compensation circuit 300 may interchangeably be referred to as a bandgap reference or a BGR.

Referring to FIG. 2, the compensation circuit 200 includes a PTAT circuit part (block) 202 including first and second stages, where each stage includes at least a PMOS and a diode connected in series; a third stage circuit part 203, and a compensation circuit part (block) 206. Circuit parts 202 and 203 may together form a "core+OPAMP" circuit part 204. Compensation block 206 may include an output block 220 including a seventh PMOS 220 (in an example, output block 220 is composed of just the single PMOS 220). Circuit part 222 includes NMOS transistors N3 and N4 which may differ from NMOS transistors Mz and Mw of FIG. 1 by having a ratio of 1:1 with respect to each other (in other words, transistors N3 and N4 may be the same size). In FIGS. 2 and 3, VDD may be a supply voltage applied to the sources of each of PMOSs P1 to P7, and VSS may be a reference potential such as a ground voltage.

Referring to FIG. 3, compensation circuit 300 may include a start-up block 302, a (core+OPAMP) block 304, and a compensation block 306. In the example of FIG. 3, compensation block 306 has the same circuit configuration as compensation block 206, but the core+OPAMP block 304 differs from block 204 by including resistors R11 and R12, discussed below. In an alternative embodiment, block 304 has the same circuit configuration as block 204.

In the compensation circuit 200/300, an operational amplifier (OPAMP) 205 includes a first input connected to a node between a first end of a first resistor R1 (also referred to as $R_{PTAT}$) and a drain of a first PMOS P1. The OPAMP 205 includes a second input connected to a node between a second diode D2 and a drain of a second PMOS P2. A third PMOS P3 includes a drain connected to one end of a second resistor R2, where another end of the second resistor R2 is connected to a third diode D3. Another end of the first resistor R2 is connected to a first diode D1.

The first diode D1 is larger than the second diode D2, so that $VBE_1$ of the first diode D1 is smaller than $VBE_2$ of the second diode D2, and the OPAMP 205 ensures that voltage at the first end of resistor R1 is equal to $VBE_2$. The first PMOS P1, the second PMOS P2 and the third PMOS P3 form a current mirror. In various examples, a ratio of the size of D2 to D1 is 1:8, 1:3, or in a range therebetween.

A fourth PMOS P4 includes a drain connected to one end of a third resistor R3, where another end of the third resistor R3 is connected to a drain of a first N-channel metal-oxide semiconductor (NMOS) N1 and a gate of the first NMOS N1. The third resistor R3 and the first NMOS N1 are connected in series to reduce a compensation current dependence on at least one metal-oxide semiconductor (MOS) process corner. Further, the compensation current is copied in the seventh PMOS P7 and fed to a node between the second resistor R2 and the third diode D3 so as to ensure the compensation current has a logarithmic effect on a bandgap reference (BGR) voltage output VREF and reduce a sensitivity of the compensation current on the BGR voltage output VREF.

A fifth PMOS P5 includes a drain connected to a drain of a second NMOS N2 and a gate of a sixth PMOS P6. A gate of the second NMOS N2 is connected to a node between a drain of the fourth PMOS P4 and the one end of the third resistor R3.

The sixth PMOS P6 includes a drain connected to one end of a fifth resistor R5, where another end of the fifth resistor R5 is connected to a node between a gate of the third NMOS N3 and a gate of a fourth NMOS N4. The seventh PMOS P7 includes a drain connected to a node between the other end of the second resistor R2 and the third diode D3. The third NMOS N3 and the fourth NMOS N4, by having a 1:1 size ratio, maintain a PTAT slope by ensuring that no current flows into the PTAT block 202. Further, the compensation circuit 200/300 controls a curvature of bandgap reference voltage output VREF with respect to temperature in a memory (e.g., NAND flash or the like). The compensation circuit 200/300 controls a complementary-to-absolute temperature (CTAT) linearization for curvature correction in the bandgap reference voltage output.

A bandgap reference (BGR) ideally provides a constant output over Process, Voltage, and Temperature (PVT). As discussed earlier, it is composed of two parts: PTAT and CTAT parts, where the PTAT part is proportional to temperature and CTAT part is complementary to PTAT. This means that a PTAT voltage linearly increases with temperature, and a CTAT voltage linearly decreases with temperature. Note that VBE (base to emitter voltage) of a diode-connected BJT (a BJT with its base and collector tied together to form a diode) is CTAT in nature, and a difference between two VBE voltages for BJTs (having different areas) is PTAT in nature. This is evident from equations that may arrive at various voltages and currents in the compensation circuits, such as those set forth below.

Further, the OPAMP 205 ensures that voltages at its two inputs are equal, due to negative feedback action. As shown in FIG. 3, an upper resistor R11 in a first branch, and a resistor R12 in a second branch ensure better drain voltage matching for current mirrors. The lower resistor R1 (interchangeably, "$R_{PTAT}$") in the first branch is used to generate the PTAT current. The following equations may define various voltages and currents in the compensation circuits 200/300:

$$I_C = \frac{V_D - V_{GS2} - V_{BE}}{R_4}$$

$$V_D = V_{th1} + k_1\sqrt{I_{PTAT}} + I_{PTAT} * R_{PTAT}$$

$$V_{GS2} = V_{th2} + k_2\sqrt{I_C},$$

As evident from the above equations, $I_C$ is virtually immune to the variation in threshold voltages of the various MOSFETS, as it contains a $(V_{th1}-V_{th2})$ component in the equation. Also, the compensation doesn't alter the PTAT curvature in the PTAT generation block 202. Instead, it linearizes the CTAT part of the output in the compensation circuit 200/300.

Figure 4:
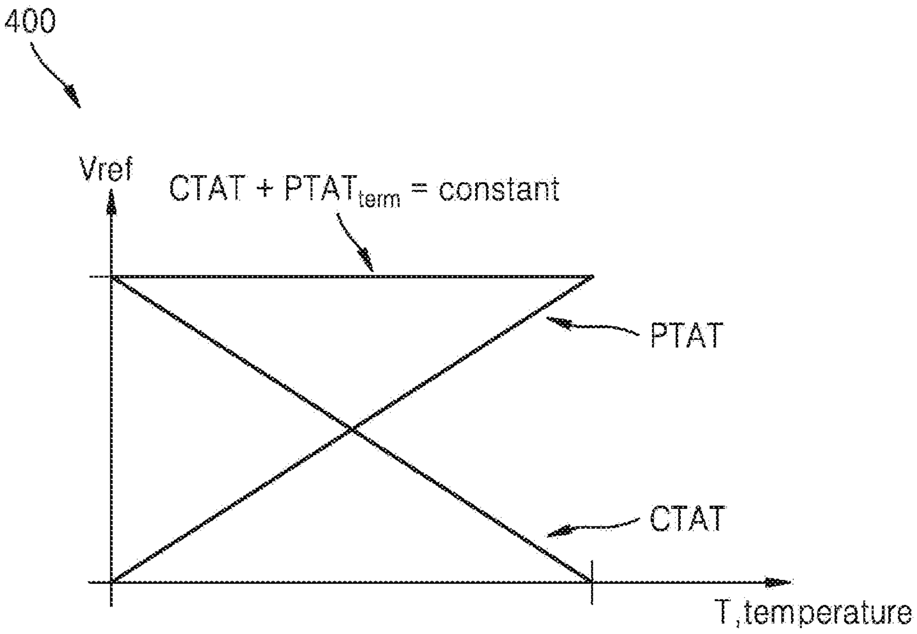
FIG. 4 illustrates a graph of a CTAT slope and PTAT slope, according to an embodiment as disclosed herein.

FIG. 4 illustrates a graph 400 of a CTAT and PTAT slope, according to an embodiment as disclosed herein.

PTAT generation: The diode D1 in the first branch is larger than a diode D2 in the second branch (where diodes D1 and D2 may be BJT-connected diodes as noted earlier). Hence, $VBE_1$ (the VBE of diode D1) is smaller than $VBE_2$ (the VBE of diode D2). Now, the OPAMP 205 ensures that the voltage at the first end of resistor R1 ($R_{PTAT}$) is equal to $VBE_2$. So that, in first branch, PTAT current $I_{PTAT}=(VBE_2-VBE_1)/R_{PTAT}$, and the same current gets copied to the second and third branch due to the current mirror formed by PMOSs P3 and P4. The PTAT current flows to the third branch, via the current mirror and gets multiplied by the resistor R2 in the third branch, to generate the PTAT voltage. So, the output voltage (VBGR)$=I_{PTAT}*R2+VBE_3$, where $VBE_3$ is the CTAT voltage of the third branch's BJT diode D3.

As shown in FIG. 3, the OPAMP 205 is connected to the start-up block 302, where the start-up block 302 handles a zero current situation in the compensation circuit (circuit block 306, or 206 when applied to FIG. 2). The start-up block 302 is useful because the core block of the bandgap reference has two steady state solutions. One, is a first solution that results in a non zero PTAT current, and the other solution is one resulting in zero current in the core block. To avoid the zero current situation, the compensation circuit 300 uses the start-up block 302, which stops the circuit from remaining in the zero-current state.

A case in which the compensation circuit 300 has attained a zero-current state solution will now be discussed. In this case, no current may flow through the three branches of the core block 304. If that happens, then VBGR is close to about 0.2-0.3V. Now, the start-up block 302 contains an inverter, formed by a PMOS P8 and an NMOS N7, whose input is VBGR at a node between the drain of PMOS P8 and the drain of NMOS N7. Since, VBGR is low, the inverter gives a high output. That output becomes the input of the NMOS N5 connected next (connected in series with an NMOS N6). As the NMOS N7 turns on, it pulls the OPAMP 205 output voltage VGPU towards ground GND (e.g., VSS). As it happens, a large current is pushed in the core block 304, because the PMOSs P1-P3 at top have their sources tied to VDD, and their gate voltages=a few mV above GND voltage. Now, the zero state solution can no longer exist and the compensation circuit 300 comes back to its other steady state solution, which is desirable, and non-zero. As this happens, VBGR=1.2V, and the inverter gives output "Low" to turn off the start-up action. (Note that the start-up block 302 further includes resistors R13 and R14.)

The resistors R1 and R2 may have resistance values sufficient to ensure that the supply voltage VDD is scaled down to a level, where 1.2V input can be treated as "1" by the inverter, and 0.2-0.3V input can be treated as "0" by the inverter.

Figure 5:
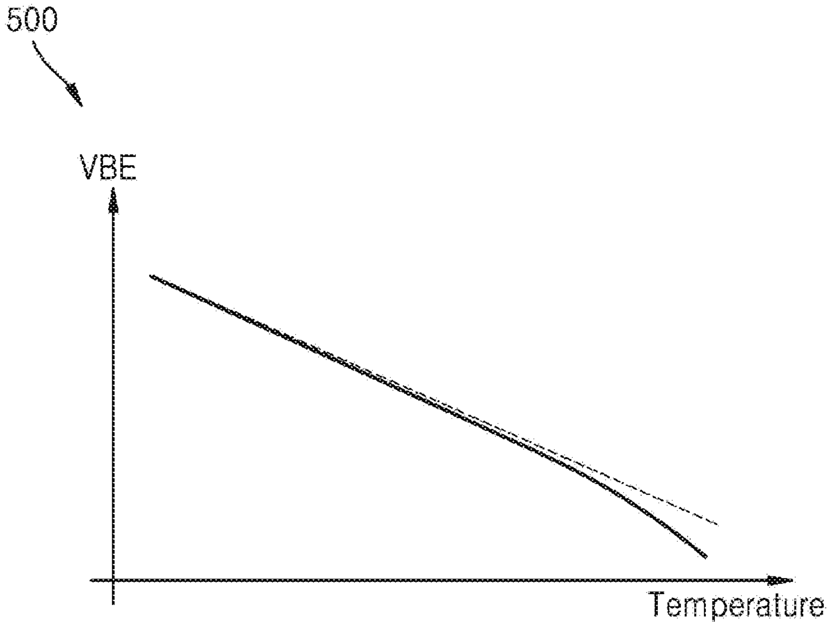
FIG. 5 illustrates a graph of a CTAT slope correction, according to an embodiment as disclosed herein.

FIG. 5 illustrates a graph 500 of a CTAT slope correction, according to an embodiment as disclosed herein. The compensation is useful in the bandgap for curvature correction, to reduce the temperature drift of the BGR voltage. It so happens, that PTAT is fairly linear with temperature, but the slope of CTAT is not linear with temperature. The solid non-linear line in the graph represents original behaviour of CTAT voltage with temperature. The addition of the compensation circuit 200/300 brings it closer to the dotted curve. The compensation circuit 200/300 generates a non-linear (often exponential) current at high temperature, which is fed to the CTAT circuit part (the node between R2 and D3) to compensate for the rapidly decreasing slope of VBE at higher temperature.

There are at least two ways to introduce curvature compensation in bandgap references. These include: (i) by adding non-linearity in the PTAT component; and (ii) by linearizing the CTAT component.

The prior art circuit of FIG. 1 takes the first approach. Embodiments herein take the second approach through use of a redesigned compensation block. Hence, the BGR output $V_{REF}$=PTAT component+CTAT component. The PTAT component may have an approximate constant slope with respect to temperature. The CTAT component has a variable dependence on temperature, hence the graph will show bell shape curve:

$$\frac{\partial V_{BE}}{\partial T} = \frac{V_{BE} - (4+m) - \frac{E_g}{q}}{T}$$

$$V_{BE} = V_{g0} - \lambda T + \frac{(\eta - m)kT_r}{q} - \frac{(\eta - m)kT_r\Delta T^2}{2qT_r}$$

η, λ=Process constant, m=a constant that depends on BJT biasing current's nature, m=0 for constant current, m=1 for PTAT current, m>1 for higher order currents.

Figure 6:
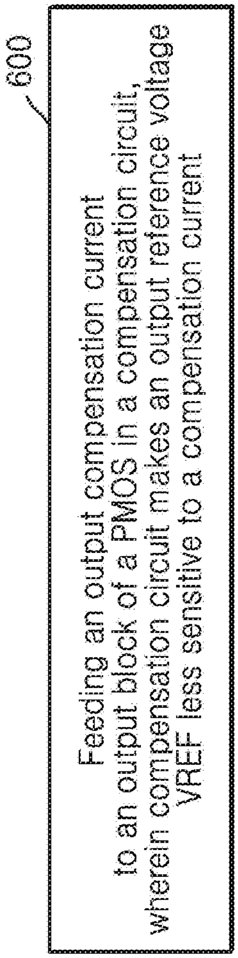
FIG. 6 is a flow chart illustrating a method for managing the curvature compensation in the bandgap reference voltage output in the compensation circuit, according to an embodiment as disclosed herein.

FIG. 6 is a flow chart 600 illustrating a method for managing the curvature compensation in the bandgap reference voltage output in the compensation circuit 200/300, according to an embodiment as disclosed herein. At 602, the method includes feeding a compensation current to a BJT diode of an output block, thus making the output voltage VREF less sensitive to the compensation current.

Advantageously, based on the embodiments of a compensation circuit 200/300, an output compensation current is fed to a BJT-connected diode of a last stage of a (core+OPAMP) block. Hence, it doesn't disturb PTAT characteristics of the bandgap reference, and also makes VREF less sensitive to compensation current, unlike the case in prior art. Replacing one diode a resistor reduces the dependence of compensation current by multifolds, on MOS process corner. It is expected that VREF should not be prone to MOS process corner variation, because MOSFETs are used only for copying current in such bandgap reference architectures. Keeping the ratio of bottom NMOS pair (N3 and N4) to 1:1 ensures that no current flows into the PTAT block 202/304, to maintain the linearity of PTAT slope. An extra branch (e.g., branch containing P7 PMOS) is used to provide the compensation current to the output stage of the (core+OPAMP) block, instead of a PTAT generation block.

The embodiments described in the specification are implemented into a bandgap reference circuit realized by way of a metal-oxide-semiconductor (MOS) technology, as it is contemplated that such implementation is particularly advantageous in that context. However, it is also contemplated that the inventive concepts may be beneficially applied to other applications, for example integrated circuits constructed by way of a bipolar complementary-MOS (BiCMOS) technology. Accordingly, it is to be understood that the above description is provided by way of example only, and is not intended to limit the true scope of the claimed subject matter.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the inventive concepts herein have been described in terms of embodiments, those skilled in the art will recognize that the inventive concepts can be practiced with modification to the embodiments as described herein.

What is claimed is:

1. A compensation circuit comprising:

an operational amplifier (OPAMP) including a first input connected to a node between one end of a first resistor and a drain of a first P-channel metal-oxide semiconductor (PMOS), the OPAMP further including a second input connected to a node between a second diode and a drain of a second PMOS;

a third PMOS including a drain connected to a first end of a second resistor, wherein a second end of the second resistor is connected to a third diode;

a fourth PMOS including a drain connected to one end of a third resistor, wherein another end of the third resistor is connected to a drain of a first N-channel metal-oxide semiconductor (NMOS) and a gate of the first NMOS;

a fifth PMOS including a drain connected to a drain of a second NMOS and a gate of a sixth PMOS, wherein a gate of the second NMOS is connected to a node between a drain of the fourth PMOS and the one end of the third resistor;

the sixth PMOS including a drain connected to one end of a fifth resistor, wherein another end of the fifth resistor is connected to a node between a gate of a third NMOS and a gate of a fourth NMOS; and a seventh PMOS including a drain connected to a node between the second end of the second resistor and the third diode, wherein the OPAMP is connected to each gate of the first PMOS, the second PMOS, the third PMOS, and the fourth PMOS.

2. The compensation circuit as claimed in claim 1, wherein the third resistor and the first NMOS are connected in series to reduce a compensation current dependence on at least one metal-oxide semiconductor (MOS) process corner.

3. The compensation circuit as claimed in claim 2, wherein the compensation current is copied in the seventh PMOS and fed to a node between the second resistor and the third diode such that the compensation current has a logarithmic effect on a bandgap reference voltage output and reduces a sensitivity of the compensation current on the bandgap reference voltage output.

4. The compensation circuit as claimed in claim 1, wherein the compensation circuit controls a curvature of bandgap reference voltage output with respect to temperature in a memory, wherein the memory includes at least one of a NAND flash or a NOR Flash.

5. The compensation circuit as claimed in claim 1, wherein the compensation circuit controls a complementary-to-absolute temperature (CTAT) linearization for curvature correction in a bandgap reference voltage output.

6. The compensation circuit as claimed in claim 1, wherein the third NMOS and the first NMOS having ratio 1:1 maintains a linearity of proportional to absolute temperature (PTAT) slope by ensuring that no current flow into a PTAT block.

7. The compensation circuit as claimed in claim 1, wherein each of a first diode and the second diode is formed by a diode-connected bipolar junction transistor (BJT), the first diode is larger than the second diode, so that a base to emitter voltage VBE1 of the first diode is smaller than a base to emitter voltage VBE2 of the second diode, and operation of the OPAMP causes a voltage at the first end of the second resistor to equal VBE2.

8. The compensation circuit as claimed in claim 1, wherein the first PMOS, the second PMOS and the third PMOS are current mirror, and wherein another end of the first resistor is connected to a first diode.

9. The compensation circuit as claimed in claim 1, wherein the OPAMP is connected to a start-up block, wherein the start-up block handles a zero current situation in the compensation circuit.

10. A method for managing a curvature compensation in a bandgap reference voltage output in a compensation circuit, comprising:

feeding an output compensation current to an output block formed by a PMOS in the compensation circuit, wherein the compensation circuit makes an output voltage VREF less sensitive to a compensation current, wherein the compensation circuit comprises:

an operational amplifier (OPAMP) having a first input connected to a node between one end of a first resistor and a drain of a first P-channel metal-oxide semiconductor (PMOS), wherein the OPAMP includes a second input connected to a node between a second diode and a drain of a second PMOS;

a third PMOS including a drain connected to a first end of a second resistor, wherein a second end of the second resistor is connected to a third diode;

a fourth PMOS including a drain connected to one end of a third resistor, wherein another end of the third resistor is connected to a drain of a first N-channel metal-oxide semiconductor (NMOS) and a gate of the first NMOS;

a fifth PMOS including a drain connected to a drain of a second NMOS and a gate of a sixth PMOS, wherein a gate of the second NMOS is connected to a node between a drain of the fourth PMOS and the one end of the third resistor;

the sixth PMOS including a drain connected to one end of a fifth resistor, wherein another end of the fifth resistor is connected to a node between a gate of a third NMOS and a gate of a fourth NMOS; and a seventh PMOS including a drain connected to a node between the second end of the second resistor and the third diode, wherein the OPAMP is connected to each gate of the first PMOS, the second PMOS, the third PMOS, and the fourth PMOS.

* * * * *